(12) United States Patent  
Wang et al.

(10) Patent No.: US 11,516,702 B2  
(45) Date of Patent: Nov. 29, 2022

(54) METHODS, SYSTEMS AND DEVICES FOR DETERMINING BUFFER STATUS REPORT

(71) Applicant: CHONGQING UNIVERSITY OF POSTS AND TELECOMMUNICATIONS, Chongqing (CN)

(72) Inventors: Ruyan Wang, Chongqing (CN); Yaping Cui, Chongqing (CN); Dapeng Wu, Chongqing (CN); Puning Zhang, Chongqing (CN); Shushan Si, Chongqing (CN)

(73) Assignee: CHONGQING UNIVERSITY OF POSTS AND TELECOMMUNICATIONS, Chongqing (CN)

(*) Notice: Subject to any disclaimer, the term of this patent is extended or adjusted under 35 U.S.C. 154(b) by 0 days.

(21) Appl. No.: 17/008,581

(22) Filed: Aug. 31, 2020

(65) Prior Publication Data

US 2020/0396637 A1     Dec. 17, 2020

Related U.S. Application Data

(63) Continuation of application No. PCT/CN2018/099791, filed on Aug. 10, 2018.

(51) Int. Cl.  
*H04W 28/02* (2009.01)

(52) U.S. Cl.  
CPC ... *H04W 28/0278* (2013.01); *H04W 28/0268* (2013.01)

(58) Field of Classification Search  
None  
See application file for complete search history.

(56) References Cited

U.S. PATENT DOCUMENTS 9,161,252 B2    10/2015   Han et al.  
2009/0113086 A1*   4/2009   Wu .................. H04W 72/1284  
                                                                  710/56

(Continued)

FOREIGN PATENT DOCUMENTS

CN      102291760 A     12/2011  
CN      106454687 A      2/2017

(Continued)

OTHER PUBLICATIONS

U.S. Appl. No. 62/663,782, filed Apr. 2018 demonstrating subject matter support relied upon in Joseph—US20190335379 (Year: 2018).*

(Continued)

*Primary Examiner* — Andre Tacdiran  
(74) *Attorney, Agent, or Firm* — Metis IP LLC

(57) ABSTRACT

The present disclosure disclosed a method of determining a buffer status report (BSR). The method comprises obtaining, by a user equipment (UE) from a buffer, data item to be sent; determining, by the UE, a size of the data item to be sent; determining, by the UE, a minimum number of required logical channel groups (LCGs) based on the data item to be sent; and determining, by the UE, at least one BSR with flexible length based on the size of the data item to be sent and the minimum number of the required LCGs. Information of the at least one BSR with flexible length includes the minimum number of the required LCGs, LCG identifiers (LCG IDs) respectively associated with the minimum number of the required LCGs, and at least one buffer area corresponding to the LCG IDs.

13 Claims, 9 Drawing Sheets

(56) References Cited

U.S. PATENT DOCUMENTS

| | | | |
|---|---|---|---|
| 2012/0033569 A1 | 2/2012 | Tesanovic et al. | |
| 2012/0033606 A1* | 2/2012 | Chun | H04W 72/1205 370/315 |
| 2012/0099452 A1 | 4/2012 | Dai et al. | |
| 2013/0003673 A1 | 1/2013 | Dinan | |
| 2013/0107828 A1 | 5/2013 | Dinan | |
| 2014/0105009 A1* | 4/2014 | Vos | H04L 47/2433 370/230 |
| 2015/0163689 A1 | 6/2015 | Lee et al. | |
| 2016/0044678 A1* | 2/2016 | Kwon | H04W 72/0453 370/329 |
| 2018/0270698 A1* | 9/2018 | Babaei | H04W 28/0278 |
| 2019/0158993 A1* | 5/2019 | Kwon | H04L 5/0091 |
| 2019/0327726 A1* | 10/2019 | Zhang | H04W 72/0413 |
| 2019/0335379 A1* | 10/2019 | Joseph | H04L 1/189 |
| 2019/0356450 A1* | 11/2019 | He | H04W 72/0406 |
| 2020/0029353 A1* | 1/2020 | Xu | H04W 72/1284 |
| 2020/0196184 A1* | 6/2020 | Tang | H04W 72/0413 |
| 2020/0382988 A1* | 12/2020 | Zhao | H04W 28/0278 |

FOREIGN PATENT DOCUMENTS

| | | |
|---|---|---|
| CN | 107360591 A | 11/2017 |
| EP | 2432290 B1 | 5/2013 |
| WO | 2018141253 A1 | 8/2018 |

OTHER PUBLICATIONS

International Search Report in PCT/CN2018/099791 dated May 5, 2019, 4 pages.

Written Opinion in PCT/CN2018/099791 dated May 5, 2019, 4 pages.

* cited by examiner

METHODS, SYSTEMS AND DEVICES FOR DETERMINING BUFFER STATUS REPORT

CROSS-REFERENCE TO RELATED APPLICATIONS

This application is a continuation of International Patent Application No. PCT/CN2018/099791, filed on Aug. 10, 2018, the entire contents of which are hereby incorporated by reference.

TECHNICAL FIELD

The present disclosure relates to the field of radio communication technologies, and in particular to methods, systems and devices for transmitting a buffer status report (BSR) with high reliable resource on a 5G new radio (NR) network.

BACKGROUND

Twenty years ago, the way to communicate remotely was to make a phone call. Ten years ago, the communication way was phone calling and online video chatting via a personal computer (PC). Five years ago, with the rapid development of mobile broadband, most of the applications may be implemented by Mobile Broadband (MBB). Radio network communication is becoming more and more important in people's life, for example online chatting, playing games, video chatting and shopping, therefore the MBB bring convenience and entertainment for people. As the higher requirement for speed of radio network data transmission, the 5G NR may be the research hotspot nowadays. The Enhance Mobile Broadband (eMBB) with 20 Gbps in the 5G era may be applied for ultra HD live video with augmented reality (AR)/virtual reality (VR), and the like; the Ultra Reliable & Low Latency Communication (uRLLC) may be applied for unmanned driving, long-distance driving; and the massive Machine Type of Communication (mMTC) may be applied for smart factories, smart cities, smart agriculture and the like, to connect everything.

In the traditional Long Term Evolution (LTE) system in the 4G era, when a User Equipment (UE) requests a network data, the LTE system may require the UE to report its own status of buffer area. The status of buffer area may be reported to the base station (e.g., eNB) in a form of Buffer Status Report (BSR). In the LTE system, a Logical Channel (LCH) may be divided into four Logical Channel Groups (LCGs), and the BSR may include the information of the number of the LCGs and the size of the data item to be sent in all LCGs. The BSR may be transmitted by a Physical Uplink Shared Channel (PUSCH).

In the 5G NR system, the number of LCGs in the UE may be increased to eight to meet the explosive growth of the mobile data. When more than one LCGs takes the data item to be sent, a long BSR including buffer information of all LCGs may be transmitted according to the LTE system; and it may waste channel resource when the number of the LCGs taking data item to be sent is less than eight.

SUMMARY

The present disclosure relates to a system of determining a buffer status report in some embodiments. The system may include at least one storage media storing a set of instructions or programs; at least one processor in communication with the at least one storage medium. Wherein when executing the set of instructions or the programs, the at least one processor may be directed to: obtain, from a buffer, at least one data item to be sent; determine a size of the at least one data item to be sent; determine a minimum number of required logical channel groups (LCGs) based on the at least one data item to be sent; and determine at least one BSR with flexible length based on the size of the at least one data item to be sent and the minimum number of the required LCGs; wherein, information of the BSR with flexible length includes the minimum number of the required LCGs, LCG identifiers (LCG IDs) respectively associated with the minimum number of the required LCGs, and at least one buffer area corresponding to the LCG IDs.

In some embodiments, to determine a minimum number of required logical channel groups (LCGs) based on the at least one data item to be sent, the processor is further directed to: determine LCGs occupied by the at least one data item to be sent based on the at least one data item to be sent; determine the minimum number of the required LCGs based on the LCGs occupied by the at least one data item to be sent.

In some embodiments, to determine at least one BSR with flexible length based on the size of the at least one data item to be sent and the minimum number of the required LCGs, the processor is further directed to: determine the LCG IDs corresponding to the required LCGs based on the minimum number of the required LCGs; and determine the at least one BSR with flexible length based on the size of the at least one data item to be sent, the minimum number of the required LCGs, and the LCG IDs.

In some embodiments, to determine the length of the at least one BSR with flexible length, the processor is further directed to: determine the structure of the at least one BSR with flexible length; and determine a preliminary length of the at least one BSR with flexible length.

In some embodiments, the processor is further directed to: determine service type of the at least one data item to be sent; determine a priority of the at least one data item to be sent based on a preset rule and the service type of the at least one data item to be sent; and determine the at least one BSR with flexible length based on the size of the at least one data item to be sent, the minimum number of the required LCGs, the LCG IDs, and the priority of the at least one data item to be sent.

In some embodiments, the service type of the at least one data item to be sent may include at least one of: Ultra Reliable & Low Latency Communication (URLLC) service, Guaranteed Bit Rate (GBR) service, and Non-Guaranteed Bit Rate (NGBR) service.

In some embodiments, to determine a priority of the at least one data item to be sent based on a preset rule and the service type of the at least one data item to be sent, the processor is further directed to: determine a QoS Class Identifier (QCI) of the at least one data item to be sent based on the service type of the at least one data item to be sent, wherein the value of the QCI is an integer between 0 and 9; and set the value of the QCI corresponding to a service type with a highest priority as 0; wherein, if the value of the QCI equals to 0, the corresponding service type of the at least one data item to be sent is an URLLC service; if the value of the QCI is an integer between 1 and 4, the corresponding service type of the at least one data item to be sent is a GBR service; and if the value of the QCI is an integer between 5 and 9, the corresponding service type of the at least one data item to be sent is a NGBR service.

In some embodiments, the processor is further directed to: transmit the at least one BSR with flexible length that is determined based on the at least one data item to be sent with high priority to a base station for requesting an uplink resource.

In some embodiments, the processor is further directed to: transmit the at least one BSR with flexible length that is determined based on the at least one data item to be sent with a high priority to a base station in duplication in at least two transmission paths; or transmit a replicate of the at least one BSR with flexible length to the base station in duplication in at least two transmission paths, wherein the replicate of the at least one BSR with flexible length is generated based on one or more LCGs with priorities greater than a preset value.

The present disclosure relates to a method of determining a buffer status report in some embodiments. The method may include one or more of following operations: obtaining, by a user equipment (UE) from a buffer, at least one data item to be sent; determining, by the UE, a size of the at least one data item to be sent; determining, by the UE, a minimum number of required logical channel groups (LCGs) based on the at least one data item to be sent; and determining, by the UE, at least one BSR with flexible length based on the size of the at least one data item to be sent and the minimum number of the required LCGs, wherein, information of the at least one BSR with flexible length includes the minimum number of the required LCGs, LCG identifiers (LCG IDs) respectively associated with the minimum number of the required LCGs, and at least one buffer area corresponding to the LCG IDs.

The present disclosure relates to a device for determining a buffer status report in some embodiments. The device may comprise computer programs, when executing the computer programs, the device may be directed to: obtain, from a buffer, at least one data item to be sent; determine a size of the at least one data item to be sent; determine a minimum number of required logical channel groups (LCGs) based on the at least one data item to be sent; and determine at least one BSR with flexible length based on the size of the at least one data item to be sent and the minimum number of the required LCGs; wherein, information of the BSR with flexible length includes the minimum number of the required LCGs, LCG identifiers (LCG IDs) respectively associated with the minimum number of the required LCGs, and at least one buffer area corresponding to the LCG IDs.

The present disclosure relates to a non-transitory computer readable medium storing computer instructions in some embodiments. When executing the computer instructions, the computer may be directed to: obtain, from a buffer, at least one data item to be sent; determine a size of the at least one data item to be sent; determine a minimum number of required logical channel groups (LCGs) based on the at least one data item to be sent; and determine at least one BSR with flexible length based on the size of the at least one data item to be sent and the minimum number of the required LCGs; wherein, information of the BSR with flexible length includes the minimum number of the required LCGs, LCG identifiers (LCG IDs) respectively associated with the minimum number of the required LCGs, and at least one buffer area corresponding to the LCG IDs.

Additional features of this disclosure may be described in the following description. Additional features will be set forth in part in the description which follows, and in part will become apparent to those skilled in the art upon examination of the following and the accompanying drawings or may be learned by production or operation of the examples. The features of the present disclosure may be realized and acquired by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
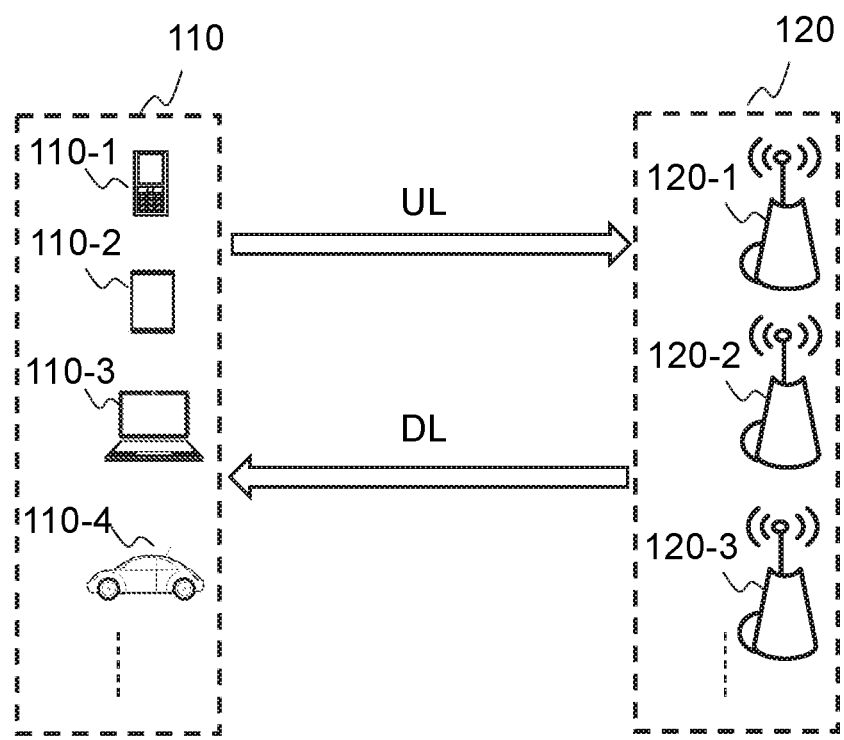
FIG. 1 is a schematic diagram of an exemplary radio network communications system according to some embodiments of the present disclosure.

In order to illustrate the technical solutions related to the embodiments of the present disclosure, brief introduction of the drawings referred to in the description of the embodiments is provided below. Obviously, drawings described below are only some illustrations or embodiments of the present disclosure. A person of ordinary skill in the art, without further creative effort, may apply the present teachings to other scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements. The term "based on" is to be read as "based at least in part on". The term "one embodiment" is to be read as at least one embodiment"; the term "another embodiment" is to be read as "at least one another embodiment". Relevant definitions of other terms will be given in the description below.

Some modules of the system may be referred to in various ways according to some embodiments of the present disclosure. However, any number of different modules may be used and operated in a user terminal and/or a server. These modules are intended to be illustrative, and different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Moreover, other operations may also be added into these procedures, or one or more steps may be removed from these procedures.

FIG. 1 is a schematic diagram of an exemplary radio network communications system according to some embodiments of the present disclosure. The radio network communications system 100 may include at least one User Equipment (UE) 110 (e.g., UE 110-1, UE 110-2 . . . UE 110-N) and at least one base station 120 (e.g., base station 120-1, base station 120-2 . . . , base station 120-N). The UE 110 may communicate with base station 120 via radio network and transmit information to each other.

The UE 110 is a device with a function of radio network communication and may be used to transmit and receive data. The UE 110 may upload data to the base station 120 and download data from the base station 120. For example, the UE 110 may send a download request to the base station 120, and receive the data from the base station 120. In some embodiments, the UE 110 may include one or more radio communication equipment. For example, the UE 110 may include a mobile phone 110-1, a tablet computer 110-2, a laptop computer 110-3, and a vehicle built-in radio communication device 110-4, or the like, or any combination thereof. In some embodiments, the UE 110 may be any device with a function of radio network communication. For example, wearable radio device, smart home device, unmanned aerial vehicle, security monitoring device, etc.

In some embodiments, when using the UE to obtain some network resource data (e.g., songs, videos, web pages), the user may send a data request to the base station 120, and request to download the network resource data. This process may be an uplink (UL) process. In some embodiments, when transmitting data to the base station, the UE must have an UL resource block (RB), otherwise the UE may need to request the RB from the base station. In some embodiments, the UE 110 may request the RB by transmitting a Buffer Status Report (BSR) to the base station. The UE may tell the base station the size of the data item to be sent in one or more LCGs, and may request some RBs from the base station by inserting a BSR data unit (also referred to as BSR controlling unit in some embodiments) in a Packet Data Unit (PDU) of MAC layer. In this mode, the base station may recognize the size of the data item to be sent of the UE and allocate RB resource specifically.

The base station 120 may be a radio transceiver station which may transmit information with the UE via a mobile communication switching center in a certain radio coverage area. The base station 120 may be configured to provide radio coverage, that is, to implement radio signal transmission between the wired communication network and the wireless terminal. In some embodiments, the base station 120 may receive radio data from the UE, and feedback corresponding radio network data to the UE 110 based on the radio data. For example, the UE may transmit a data request of network resource to the base station 120, and request the download of the network resource data when the user needs to receive some network resource data (e.g., songs, videos, web pages). At this time, the base station 120 may transmit the network resource to the UE 110 based on the data request from the UE 110. The above process may be the DownLink (DL) process. In some embodiments, the base station 120 may allocate radio data for the UE 110, receive the BSR data unit reported by the UE 110 via the radio resource carried by the UL, and analyze the BSR data unit to obtain the buffer status of the UE 110.

Figure 2:
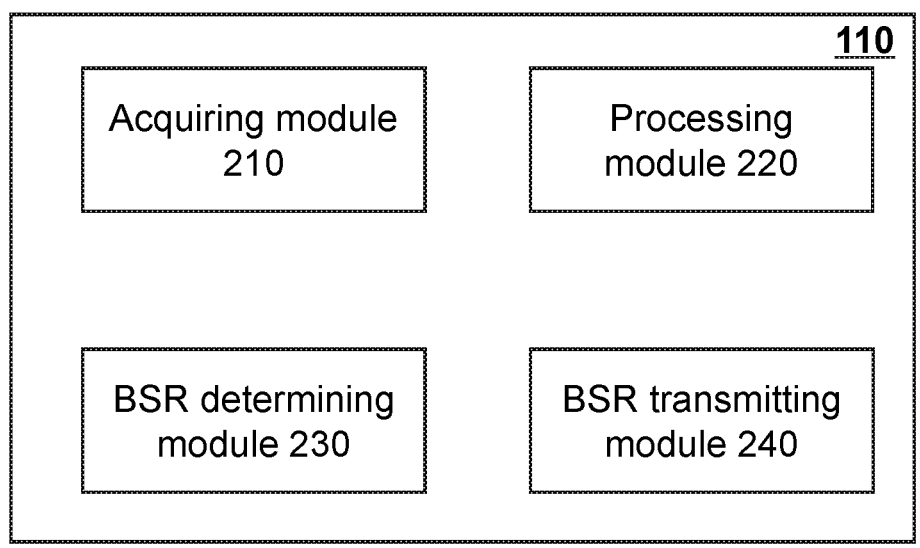
FIG. 2 is a block diagram of an exemplary UE according to some embodiments of the present disclosure.

FIG. 2 is a block diagram of an exemplary UE according to some embodiments of the present disclosure. The UE 110 may include an acquiring module 210, a processing module 220, a BSR determining module 230 and a BSR transmitting module 240. In some embodiments, the UE 110 may include at least one processor, the processor may include an acquiring module 210, a processing module 220, a BSR determining module 230 and a BSR transmitting module 240. The connection between the modules may be wired, wireless or a combination of both. Any module may be local, remote, or a combination of both. The corresponding relationship between modules may be one-to-one or one-to-many.

The acquiring module 210 may acquire the data item to be sent from the buffer. In some embodiments, the acquiring module 210 may acquire data item to be sent from the buffer. The data item to be sent may be the data to be transmitted to the base station in the buffer. In some embodiments, the acquiring module 210 may monitor the buffer status. The acquiring module 210 may obtain information of the data item to be sent from the buffer, when the data is required to be transmitted. In some embodiments, the size of the data item to be sent of the UE may be variable, for example, the size of the data item to be sent of the UE may be 999 bits at a time, and the size of the data item to be sent of the UE may be 99999 bits in the next second. The acquiring module 210 may obtain the variable data item to be sent in the buffer, and transmit the data to the processing module 220 to be further processed.

The processing module 220 may be configured to analyze and process the data. The processing module 220 may receive the data obtained by the acquiring module 210, and analyze and process the data to obtain a result. For example, the processing module 220 may calculate and analyze the data item to be sent obtained by the acquiring module 210 to determine the size of the data item to be sent. For example, the processing module 220 may calculate the size of the data item to be sent in the buffer in real time. It may be understood that the processing module 220 may monitor the buffer status, and the processing module 220 may immediately obtain and calculate the size of the data item to be sent, once the processing module 220 monitors the data is required to be sent in the buffer. In some embodiments, the processing module 220 may determine a minimum number of required logical channel groups (LCGs) based on the data item to be sent. For example, the processing module 220 may determine the LCGs occupied by the data item to be sent based on the data item to be sent; and may determine the minimum number of the required LCGs based on the LCGs occupied by the data item to be sent. In some embodiments, the required LCGs may be the LCGs configured to transmit the data item to be sent, the minimum number of the required LCGs may be a minimum number of the required LCGs to transmit the data item to be sent.

In some embodiments, the processing module 220 may determine the Logical Channel Group identifiers (LCG IDs) corresponding to the required LCGs based on the minimum number of the required LCGs. In the 4G LTE protocol, the maximum number of LCGs supported by the UE may be 4, and the range of the corresponding LCG IDs may be from 0 to 3, which may occupy 2 bits. In 5G NR protocol, the maximum number of the LCGs supported by the UE may be increased from 4 to 8 to meet the explosive growth of the mobile data, and the corresponding LCG IDs range may be from 0 to 7, which may occupy 3 bits. In some embodiments, the LCG IDs may be determined by the Radio Resource Control (RRC). For example, if the determined number of the LCGs is 3, the RRC may configure 3 LCG IDs to the LCGs, such as LCG ID #1, LCG ID #2 and LCG ID #3; or LCG ID #1, LCG ID #4 and LCG ID #5. The specific value of each of the LCD ID may be determined by the RRC. In some embodiments, the radio communication protocol may specify values of specific LCG IDs for some certain LCGs. For example, the LCG comprising signaling radio bearers SRB0, SRB1, SRB2 may need to be fixedly configured with LCG ID=0.

In some embodiments, the processing module 220 may process the data item to be sent to determine the service type of the data item to be sent. And further, the processing module 220 may determine the priority of the data item to be sent based on a preset rule and the service type of the data item to be sent. In some embodiments, the processing module 220 may process the data item to be sent, and transmit the processing result to the BSR determining module 230.

The BSR determining module 230 may determine at least one BSR data unit with flexible length. In some embodiments, the BSR determining module 230 may receive data acquired by the acquiring module 210, and/or data processed by the processing module 220, and determine the BSR data unit with flexible length based on the data. For example, the BSR determining module 230 may determine the BSR data unit with flexible length based on the size of the data item to be sent, the number of the LCGs, and the LCG IDs corresponding to the required LCGs. The BSR data unit with flexible length may include at least the number of the LCGs with data item to be sent, the LCG IDs and an at least one buffer area corresponding to the LCG IDs. In some embodiments, the BSR data unit with flexible length may be a short BSR data unit or a long BSR data unit. In 5G NR protocol, when there is only one LCG being used to transmit data item to be sent, the BSR data unit with flexible length may be a short BSR data unit; when there are eight LCGs being used to transmit data item to be sent, the BSR data unit with flexible length may be a long BSR data unit. In some embodiments, the structure of the BSR data unit with flexible length may be fixed, which may include at least the number of the required LCGs of the data item to be sent, the LCG IDSs corresponding to the required LCGs and at least one buffer area corresponding to the LCG IDs.

In some embodiments, the BSR determining module may determine the BSR data unit with flexible length based on the priority of service type of the data item to be sent. For example, the BSR determining module 230 may determine the BSR data unit with flexible length based on the size of the data item to be sent, the minimum number of the LCG, the LCG IDs and the priority of the service type of the data item to be sent. The BSR data unit with flexible length may include at least of the number of the LCGs with data item to be sent, the LCG IDs, the priority of the service type of the data item to be sent and the at least one buffer area corresponding to the LCG IDs.

The BSR transmitting module 240 may transmit the determined BSR data unit with flexible length to the base station for requesting the uplink resource. In some embodiments, the BSR transmitting module may transmit the BSR with flexible length, determined based on the data item to be sent with high priority, to a base station for requesting uplink resource preferentially. In some embodiments, the BSR transmitting module may transmit the BSR with flexible length, determined based on the data item to be sent with high priority, in duplication in at least two transmission paths to the base station to improve the probability that sufficient uplink RB resources are requested and the transmission of the data with high reliability is successful. For example, if the LCG in one BSR include data with high reliability and general data, only the data with high reliability may be duplicated to form a BSR to avoid that the LCG with high reliability cannot be allocated with uplink RB resources because of the failure of the BSR transmission.

The description above is provided for illustration purposes, and should not be considered as the only practical embodiment. Obviously, for persons having ordinary skills in the art, multiple variations and modifications may be made under the teachings of the present disclosure. For example, the acquiring module 210 and the processing module 220 may be combined, and the combined module may have the functions of data acquisition and data processing; The UE 110 may further include a storage module and/or monitoring module. All such variations and modifications are within the protection scope of the present disclosure.

Figure 3:
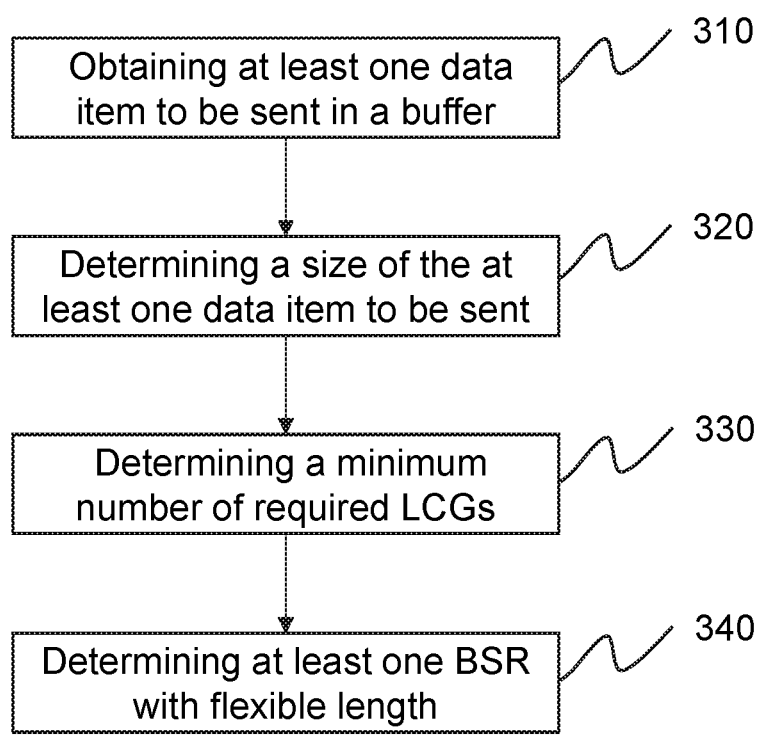
FIG. 3 is a flow chart of an exemplary process for determining a BSR with flexible length according to some embodiments of the present disclosure.

FIG. 3 is a flow chart of an exemplary process for determining a BSR with flexible length according to some embodiments of the present disclosure.

In step 310, the UE 110 may obtain at least one data item to be sent in a buffer. The data item to be sent may be the data to be transmitted to the base station in the buffer. In some embodiments, the UE 110 may monitor the buffer status, the UE 110 may obtain the data item to be sent in the buffer, when the data needs to be transmitted. For example, when some phone functions don't need to access the network, or the phone may be offline (turn on the airplane mode), the buffer of the UE may have no data item to be sent. When the user is using some network function of the phone (e.g., listening songs, watching videos and browsing webpages), the UE may monitor the data item to be sent in the buffer, and request the uplink RB resources.

In step 320, the UE 110 may determine a size of the at least one data item to be sent. The UE 110 may analyze the data item to be sent to determine the bit occupied by the data item to be sent. In some embodiments, the UE may flexibly determine the size of the buffer based on the size of the data item to be sent. It may be understood that the size of the buffer in the flexible BSR may reflect the size of the data item to be sent. In some embodiments, the size of the data item to be sent of the UE 110 is variable, for example, the size of the data item to be sent of the UE may be 666 bits at a time, and the size of the data item to be sent may be 999999 bits in the next second. The 5G NR protocol may encode the BSR in the following rule: 64 indexes from 0 to 63 may be used to represent different bit ranges. In this way, the BSR may only need a space of six bits to represent the range of the size of the data item to be sent, and don't need to encode the actual size of the data item to be sent into BSR, which may reduce the bit of the air interface transmission. Defining index=0 means that there may be no data item to be sent in an LCG, and index=63 means that the size of data in a LCG may be more than 150K. For example, when a data item to be sent occupies 30 bits, the value of the buffer size (size of the buffer area) in the BSR may be 8 (the range of the data item to be sent in the buffer is 26-31 bits according to the encoding rule when index=8) in the buffer. After encoding the BSR, the base station may recognize the value of the buffer size in the BSR is 8, therefore the base station may know that the size of the data item to be sent of the UE may be between the 26 bits and 31 bits. The BSR encoding method of dividing the range of the data item to be sent into 64 indexes, may be the same as the prior art method of BSR encoding in the LTE Release 8.

In step 330, the UE 110 may determine a minimum number of required LCGs. In some embodiments, the UE 110 may determine the number of required LCGs based on the data item to be sent. For example, the UE 110 may determine the LCGs occupied by the data item to be sent based on the data item to be sent; and may determine the minimum number of the required LCGs based on the LCGs occupied by the data item to be sent. Merely for example, the size of the data item to be sent may be 200K bits, the UE 110 may obtain the size of the data and determine that at least two LCGs may be used to send the 200K bits data, so the minimum number of the required LCG is 2. In some embodiments, the UE may monitor the status of the LCGs, and determine the LCGs with data item to be sent and calculate the number of the LCGs with data item to be sent as the minimum number of the required LCGs. In some embodiments, the required LCGs may be the LCGs with data item to be sent, the minimum number of the required LCGs may be the number of the LCGs with data item to be sent in the buffer.

In step 340, the UE 110 may determine the BSR data unit with flexible length. In some embodiments, the UE may determine at least one BSR data unit with flexible length based on the size of the data item to be sent and the minimum number of the required LCGs. The BSR data unit with flexible length may include at least the number of the LCGs with data item to be sent, the LCG IDs and an at least one buffer area corresponding to the LCG IDs. Wherein the LCG IDs may be determined based on the minimum number of the required LCGs and Radio Resource Control (RRC). In the 5G NR protocol, the maximum number of the LCGs supported by the UE may be increased from 4 to 8 to meet the explosive growth of the mobile data, and the corresponding LCG IDs range is from 0 to 7, which may occupy 3 bits. In some embodiments, the LCG IDs may be determined by the Radio Resource Control (RRC). For example, if the determined number of the LCG is 3, the RRC may configure 3 LCG IDs for the LCG, such as LCG ID #1, LCG ID #2 and LCG ID #3; or LCG ID #1, LCG ID #4 and LCG ID #5. The specific value of the LCD ID may be determined by the RRC. For example, the RRC may determine the LCGs based on the data item to be sent, and determine the LCG IDs corresponding to the required LCGs. As another example, the RRC may determine the LCG IDs corresponding to the required LCGs based on characteristics (data type, transmitting priority, and the like) of the data item to be sent. In some embodiments, the radio communication protocol may specify values of specific LCG IDs for some certain LCGs. For example, the LCG comprising signaling radio bearers SRB0, SRB1, SRB2 may need to be fixedly configured with LCG ID=0. In some embodiments, the determination of the LCG IDs may base on the priority of the service type of the data took by the LCG. For example, the LCG IDs may be determined as 1 for a service type with high priority. As another example, when the number of the determined LCGs is 3, and the priorities of the data item to be sent are 0, 1, and 2, respectively, the LCG IDs may be determined as LCG ID #0, LCG ID #1 and LCG ID #2.

In some embodiments, the BSR data unit with flexible length may include a short BSR data unit and a long BSR data unit. In the 5G NR protocol, when there is only one LCG being used to transmit data item to be sent, the BSR data unit with flexible length may be a short BSR data unit, and when there are eight LCGs being used to transmit data item to be sent, the BSR data unit with flexible length may be a long BSR data unit, which may be detailed described in FIG. 4, FIG. 5a, and FIG. 5b.

In some embodiments, the UE 110 may determine the BSR data unit with flexible length based on the priority of the data item to be sent. For example, the UE 110 may determine the BSR data unit with flexible length based on the size of the data item to be sent, the minimum number of the LCGs, the LCG IDs and the priority of the data item to be sent. The BSR data unit with flexible length may include at least of the number of the LCGs with data item to be sent, the LCG IDs, the at least one buffer area corresponding to the LCG IDs, and the priority of the data item to be sent, which may be detailed described in FIG. 7 and FIG. 8.

It should be noted that the above description is provided for the purposes of illustration, and not intended limit the scope of the present disclosure. Obviously, for persons having ordinary skills in the art, multiple variations and modifications may be made under the teachings of the present disclosure. For example, one or more other operations may be added to the flow charts, or one or more steps may be omitted from the flow chart; or one storing step may be added to store the data of all steps. As another example, step 310 and step 320 may be combined to directly obtain the data item to be sent and determine the size of the data. All such variations and modifications are within the protection scope of the present disclosure.

Figure 4:
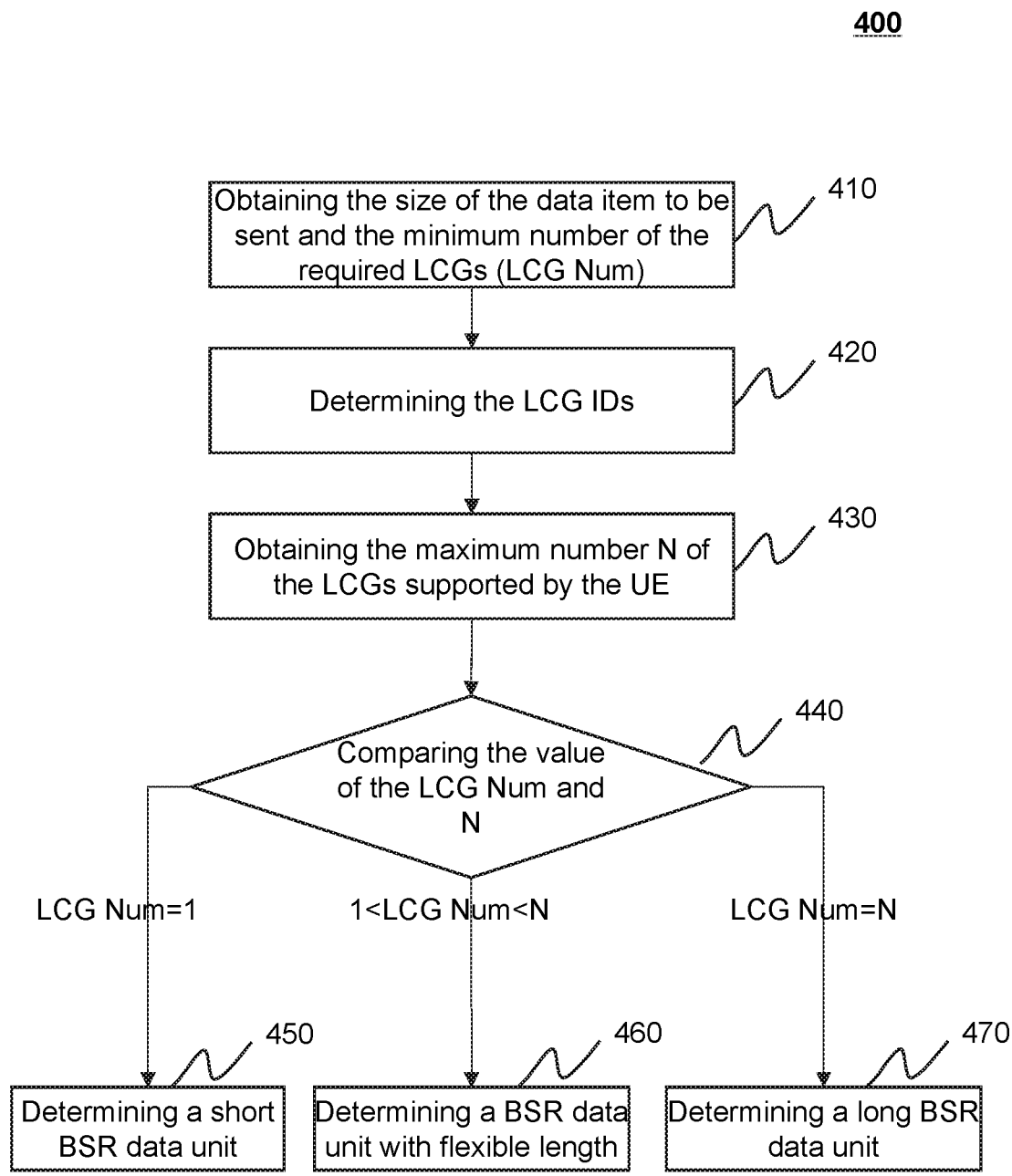
FIG. 4 is a flow chart of an exemplary process for determining a type of BSR with flexible length according to some embodiments of the present disclosure.

FIG. 4 is a flow chart of an exemplary process for determining a type of BSR with flexible length according to some embodiments of the present disclosure. In some embodiments, the BSR data unit with flexible length may include a short BSR data unit and a long BSR data unit. In the 5G NR protocol, when there is only one LCG being used to transmit data item to be sent, the BSR data unit with flexible length may be a short BSR data unit; when there are eight LCGs being used to transmit data item to be sent, the BSR data unit with flexible length may be a long BSR data unit; when the number of required LCGs is between 2 and 7, the length of BSR data unit may be flexible. The type of the BSR data unit may be determined based on the number of the LCGs with data item to be sent.

In step 410, the UE 110 may obtain the size of the data item to be sent and the minimum number of the required LCGs (LCG Num). The description and steps of obtaining the size of the data item to be sent and the LCG Num may consistent with the description of step 310, step 320 and step 330 in FIG. 3, and the details are not repeated herein.

In step 420, the UE 110 may determine the LCG IDs. In some embodiments, the UE 110 may determine LCG IDs used for sending data based on the LCG Num and the service type of the data item to be sent by the UE in the 5G NR protocol. In the 5G NR protocol, the maximum number of LCGs supported by the UE may be increased from 4 to 8 to meet the explosive growth of the mobile data, and the value of the corresponding LCG IDs may between 0 and 7, which may occupy 3 bits.

In step 430, the UE 110 may obtain the maximum number N of the LCGs supported by the UE. The maximum number N of the LCGs supported by the UE may be determined by the configuration requirements of the radio network communication protocol for the UE. In the 4G LTE protocol, the maximum number of the LCGs supported by the UE is 4; and in the 5G NR protocol, the maximum number of the LCGs supported by the UE may increase from 4 to 8 to meet the explosive growth the mobile data. The 5G NR may have higher hardware requirements for the UE to meet the requirements of higher data rates.

Figure 5A:
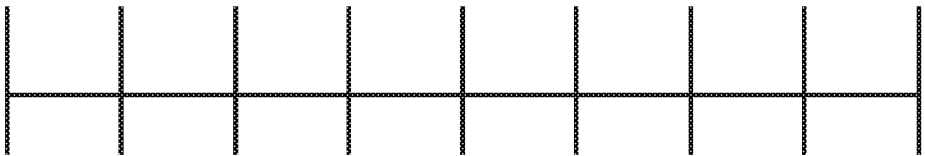
FIGS. 5a-5c are schematic diagrams of an exemplary short BSR, long BSR and flexible BSR with specific length respectively according to some embodiments of the present disclosure.
Figure 5B:
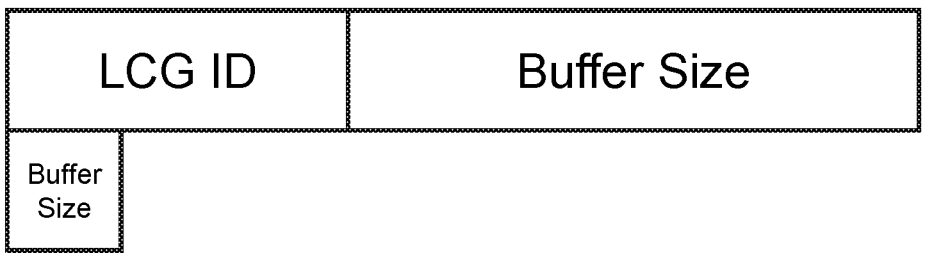
Figure 5C:
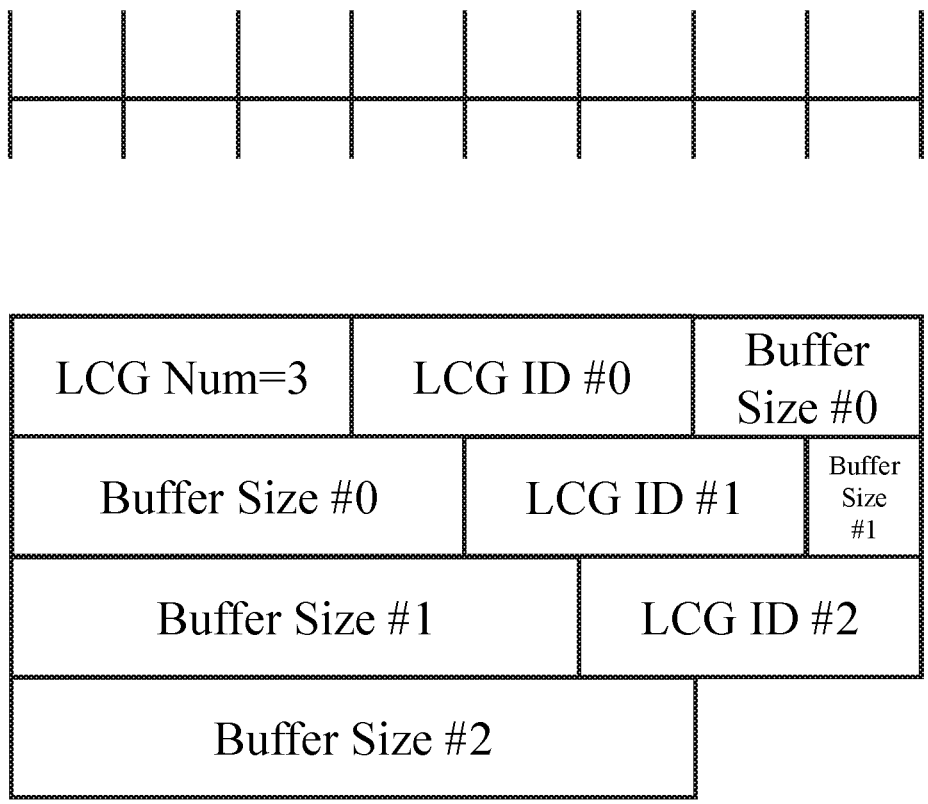

In step 440, the UE 110 may compare the value of the LCG Num and N. If the LCG Num=1, going to step 450. The UE 110 may determine a short BSR data unit. As shown in FIG. 5a, the short BSR data unit may include an LCG IDs occupying 3 bits and a BSR buffer occupying 6 bits. Wherein, the BSR buffer occupying 6 bits may have a case of byte cross, and high-lower bit merging of the byte cross may be required. If the LCG Num=N, going to step 470. The UE 110 may determine a long BSR data unit. As shown in FIG. 5b, the long BSR data unit may include eight BSR buffers, each of which occupies 6 bits. The long BSR data unit may fixedly occupy 6 octets (Oct 6) and may bear BSR information of all LCGs. Therefore, it is no need to store the values of the LCG IDs. If 1<LCG Num<N, going to step 460. The UE 110 may determine a BSR data unit with flexible length. As shown in FIG. 5c, the BSR data unit with flexible length may be determined based on the size of the data item to be sent, the number of the LCGs used to transmit data, and LCG IDs. As shown in FIG. 5c, the number of the LCGs used to transmit data is 3, each of the three LCG IDs occupies 3 bits and each of the three BSR buffer occupies 6 bits, and the determined BSR data unit occupies 4 octets (Oct 4). If the number of the LCGs used to transmit data is 4, an LCG ID #3 and Buffer Size #3, occupying the same bits, may be added to the end of the BSR data unit with the LCG Num=4.

It should be noted that the above description is provided for the purposes of illustration, and not intended limit the scope of the present disclosure. Obviously, for persons having ordinary skills in the art, multiple variations and modifications may be made under the teachings of the present disclosure. For example, one or more other operations may be added to the flow charts, or one or more operations may be omitted from the flow chart. As another example, step 410 and step 420 may be combined to directly obtain the size of the data item to be sent and LCG Num, and determine the corresponding LCG IDs. All such variations and modifications are within the protection scope of the present disclosure.

FIG. 5a, 5b, 5c are schematic diagrams of an exemplary short BSR, long BSR and flexible BSR with specific length respectively according to some embodiments of the present disclosure. As shown in FIG. 5a, the short BSR determined by the UE 110 may include one LCG IDs occupying 3 bits and one BSR buffer occupying 6 bits. In 5G NR protocol, eight LCGs may be determined and the range of the LCG IDs may be from 0 to 7, which may occupy 3 bits. The BSR buffer occupying 6 bits may have a case of byte cross, and high-lower bit merging of the byte cross may be required. The short BSR data units may occupy a total of 2 octets. As shown in FIG. 5b, the long BSR determined by the UE 110 may include eight BSR buffers, each of which occupies 6 bits. The long BSR data unit fixedly occupies 6 octets (Oct 6) and may carry BSR information of all LCGs. Therefore, it is no need to store the values of the LCG IDs. As shown in FIG. 5c, the UE 110 may determine a BSR data unit with flexible length, wherein the FIG. 5c shows the structure of the BSR data unit when the number of LCGs is 3. When the LCG Num is 3, each of the three LCG IDs occupies 3 bits and each of the three BSR buffer occupies 6 bits, and the determined BSR data unit occupies 4 octets (Oct 4). If the number of the LCG used to transmit data is 4, an LCG ID #3 and Buffer Size #3, occupying the same bits, may be add to the end of the BSR data unit with LCG Num=4. In some embodiments, when the LCG Num=1 or 8 in 5G NR protocol, the UE may determine a unified BSR data unit with flexible length instead of the short BSR and the long BSR. The range of the LCG Num may be from 1 to 8. The BSR with flexible length may include the LCG IDs, the size of the data item to be sent and the number of the LCGs indicated in the header of the BSR data unit. The range of the length of the BSR data unit with flexible length may be from 12 bits to 75 bits. When LCG Num=n, the length of determined data unit may be $L_1 = 3+9n$ bits, wherein 3 refers to bits occupied by the LCG Num, 9 refers to bits occupied by the LCG IDs and the Buffer Sizes.

Figure 6:
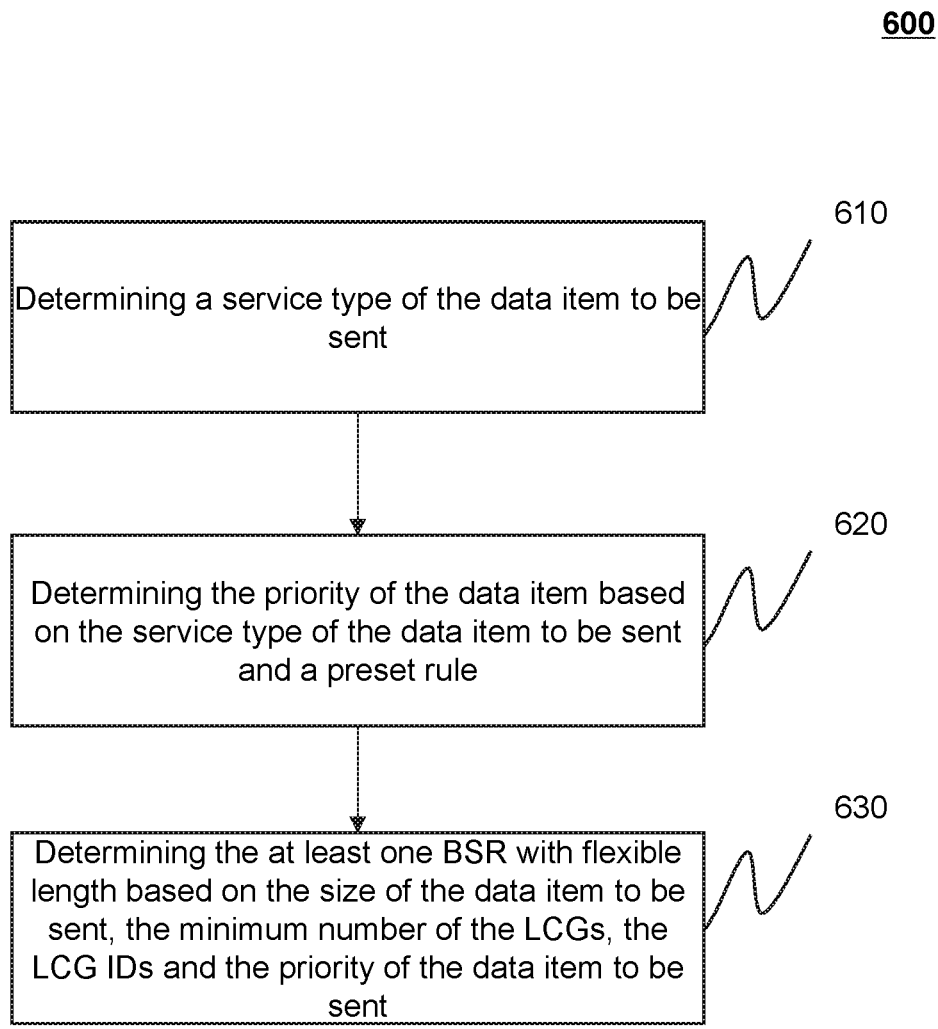
FIG. 6 is a flowchart of an exemplary process for determining a BSR with flexible length based on the priority of the data item according to some embodiments of the present disclosure.

FIG. 6 is a flowchart of an exemplary process for determining a BSR with flexible length based on priority of the data item according to some embodiments of the present disclosure.

In step 610, the UE 110 may determine a service type of the data item to be sent. The service type of the data item to be sent may include at least one of Ultra Reliable & Low Latency Communication (URLLC) service, Guaranteed Bit Rate (GBR) service, and Non-Guaranteed Bit Rate (NGBR) service. Wherein, the URLLC service may include service requiring connection with high reliability and low latency, for example, unmanned driving, industrial automation, and the like. The GBR service may include real-time service, for example real-time voice, real-time video call, real-time game, etc., which are required to guarantee a certain bit rate. The NGBR service may include video IP Multimedia Subsystem (IMS) signaling, buffer, webpage, mail, and the like. In some embodiments, the UE 110 may obtain the data item to be sent, analyze the data item to be sent, and determine service type corresponding to the data.

In step 620, the UE 110 may determine the priority of the data item based on the service type of the data item to be sent and a preset rule. In the 5G NR protocol, the preset rule may be determined based on the priority of nine QCIs of the LTE. The priority of the high reliable service may be determined separately. The QCI corresponding to the service type with highest priority may be set to be 0, the value of the priority of service may be an integer between 0 and 9, which may occupy 4 bits. Wherein, if the value of the QCI equals to 0, the corresponding service type of the at least one data item to be sent is an Ultra Reliable & Low Latency Communication (URLLC) service; if the value of the QCI is an integer between 1 and 4, the corresponding service type of the at least one data item to be sent is a Guaranteed Bit Rate (GBR) service; if the value of the QCI is an integer between 5 and 9, the corresponding service type of the at least one data item to be sent is a Non-Guaranteed Bit Rate (NGBR) service. The correspondence between the QCIs and the service types is shown in the following table:

| QCI | Service type | Priority | Packet Delay Budget | Loss Rate | Example Services |
|---|---|---|---|---|---|
| 0 | URLLC | 1 | 10 ms | $10^{-2}$ | Unmanned Driving, Industrial Automation, etc. |
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |

-continued

| QCI | Service type | Priority | Packet Delay Budget | Loss Rate | Example Services |
|---|---|---|---|---|---|
| 5 | NGBR | 0 | 100 ms | $10^{-6}$ | IMS Signaling |
| 6 | NGBR | 6 | 300 ms | $10^{-6}$ | Video (Buffered Streaming) TCP-based (e.g., www, e-mail, chat, ftp, p2p file sharing, progressive video, etc.) |
| 7 | NGBR | 7 | 100 ms | $10^{-3}$ | Voice, Video (Live Streaming) Interactive Gaming |
| 8 | NGBR | 8 | 300 ms | $10^{-6}$ | Video (Buffered Streaming) TCP-based (e.g., www, e-mail, chat, ftp, p2p file sharing, progressive video, etc.) |
| 9 | NGBR | 9 | 300 ms | $10^{-6}$ | Video (Buffered Streaming) TCP-based (e.g., www, e-mail, chat, ftp, p2p file sharing, progressive video, etc.) |

It should be noted that, the value of the QCI of the URLLC service is 0, and the priority is 1; the value of the QCI of the IMS Signaling is 5, and the priority is 0. The packet delay budget of the data packet of the URLLC may be set to 10 ms, and the loss rate may be set to 0.01.

Figure 7A:
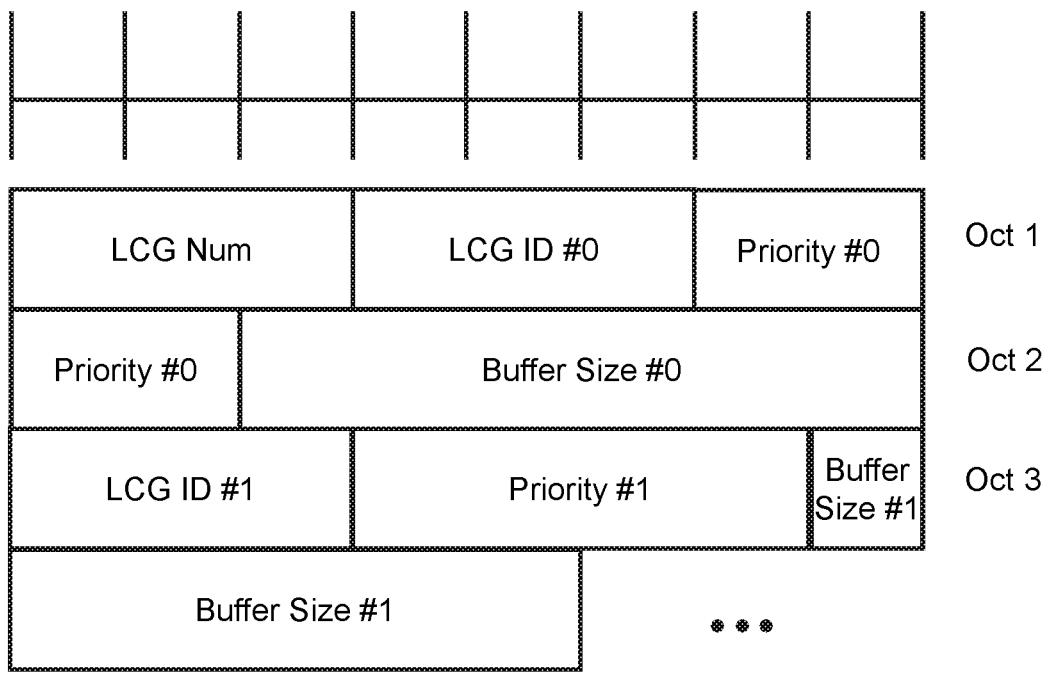
FIG. 7a is a schematic diagram of an exemplary BSR with flexible length according to some embodiments of the present disclosure.
Figure 7B:
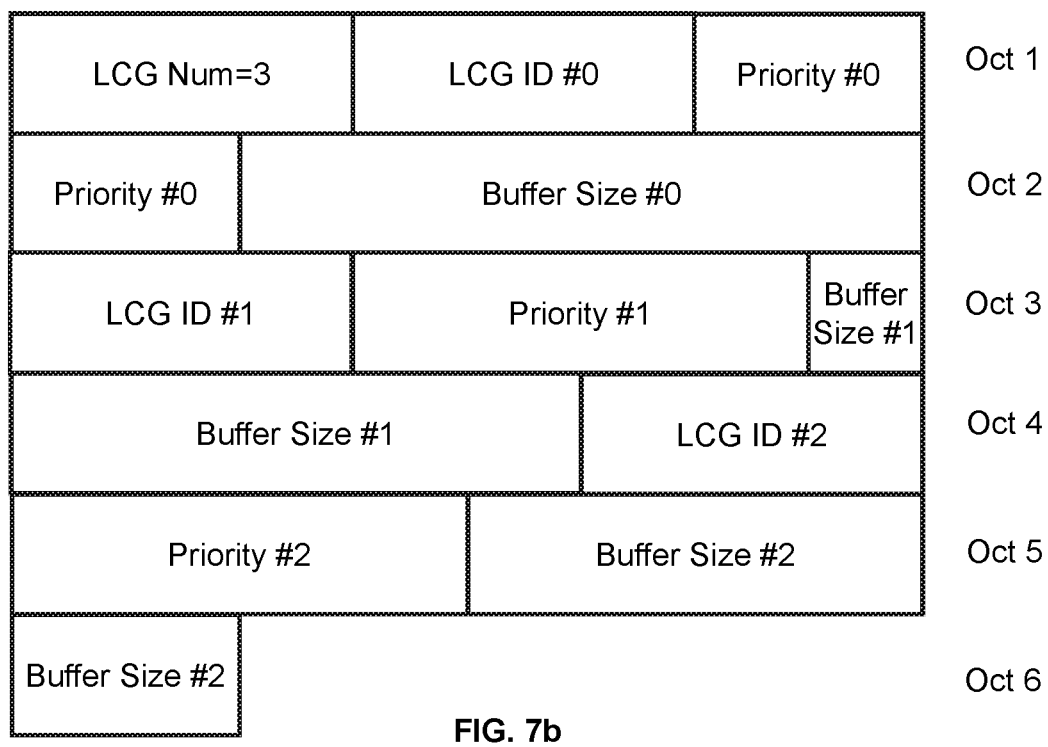
FIG. 7b is a schematic diagram of an exemplary flexible BSR with specific length according to some embodiments of the present disclosure.

In step 630, the UE 110 may determine the at least one BSR with flexible length based on the size of the data item to be sent, the minimum number of the LCGs, the LCG IDs and the priority of the data item to be sent. As shown in FIG. 7a, the BSR data unit with flexible length may include the LCG IDs corresponding to each of the LCGs with data item to be sent, Buffer Size, the priority of the data item of the LCG and the LCG Num (the value of which is from 1 to 8) indicated in the header of the BSR data unit. The range of length of the BSR with flexible length may be from 16 bits to 107 bits. The length of the determined BSR with flexible length may be determined based on the value of the LCG Num. For LCG Num=m, the length of the corresponding determined flexible BSR may be $L_2$=3+13m bits, wherein 3 refers to the bit size occupied by the LCG Num, 13 refer to total bit size of the LCG IDs (3 bits) and the Priority (4 bits) and the Buffer Size (6 bits). For example, when the value of the LCG Num is 3, as shown in FIG. 7b, the LCG Num with data item to be sent may be 3, and each LCG with data item to be sent corresponds to a LCG ID, a Priority and a Buffer Size. The length of the determined flexible BSR is 6 octets (Oct 6) when LCG Num=3.

In some embodiments, the system may separately determine the priority for service with high reliability, and determine the BSR with flexible length based on the priority of the service with high reliability. Only the buffer information in the LCG with the data item to be sent may be reported by the system, which may greatly save the system resources in the 5G.

Figure 8:
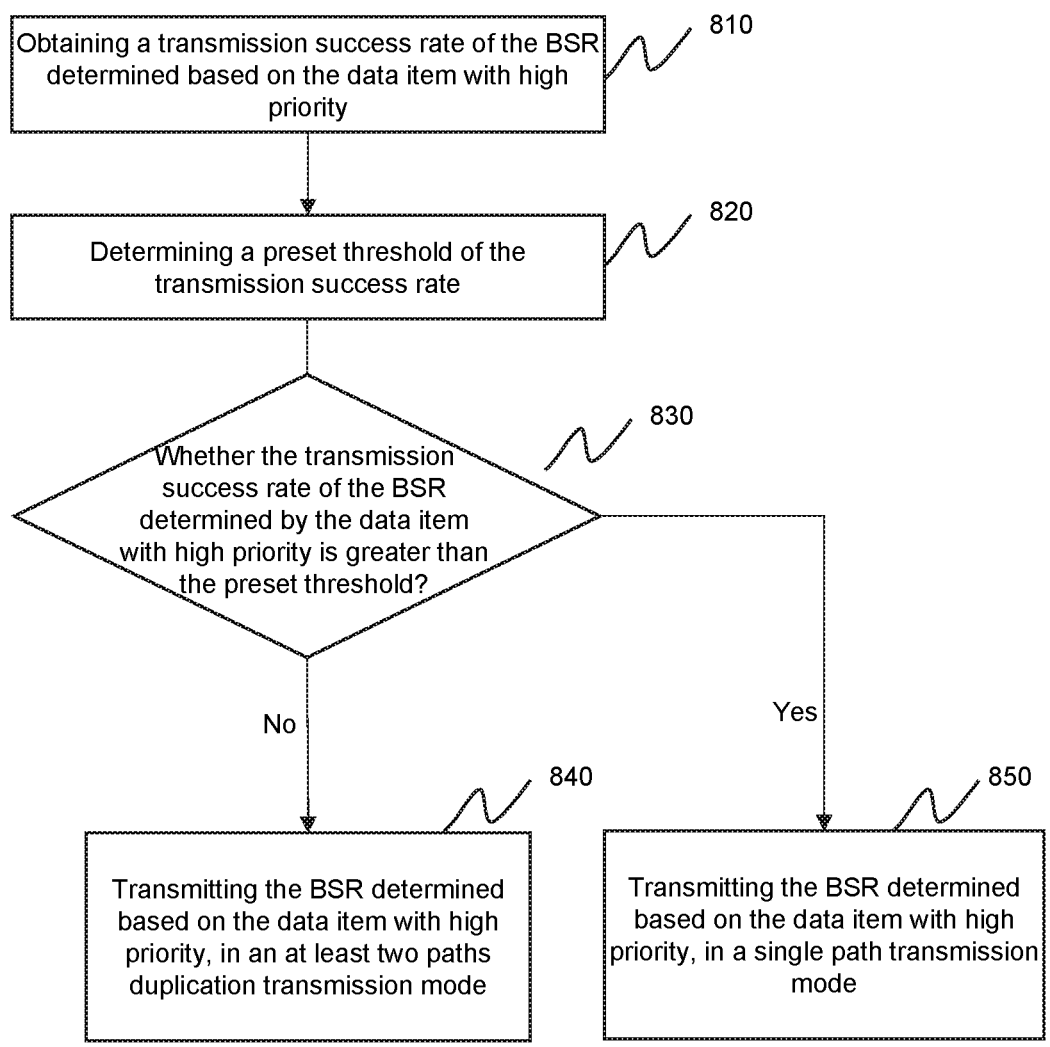
FIG. 8 is a flowchart of an exemplary process for transmitting the BSR with high priority data in duplication in at least two transmission paths according to some embodiments of the present disclosure.

FIG. 8 is a flowchart of an exemplary process for transmitting the BSR with high priority data in duplication in at least two transmission paths according to some embodiments of the present disclosure. In order to ensure the reliability of the reliable service transmission, the at least two paths duplication may be used for the LCGs with high reliable service. In some embodiments, if the data of the LCGs in one BSR includes data of service type with high reliability (or high priority) and general data, only the data of service type with high reliability may be duplicated to form a BSR to avoid that the LCG with high reliability cannot be allocated with uplink RB resources because of the failure of the BSR transmission. In another embodiment, the UE may transmit the BSR data unit, determined based on the data item to be sent with high priority, to the base station to request uplink RB resources preferentially and transmit the BSR with flexible length in duplication in at least two transmission paths transmission mode to the base station, to improve the transmission success rate of the BSR determined based on the data item with high priority.

In step 810, the UE 110 may obtain a transmission success rate of the BSR determined based on the data item with high priority. The BSR determined based on the data with high priority may include the BSR with any one of the LCGs transmitting the data with high priority. For example, the UE 110 may obtain the transmission success rate with different types of BSRs from the historical data, and calculate related characteristic information. The different types of BSRs may include BSRs determined based on different service types of data, BSRs determined based on different size of the data and BSRs determined based on different numbers of LCGs, and the like. In some embodiments, the UE 110 may predict the success rate of transmitting each BSR according to the characteristics of a BSR, such as structure and length, based on the historical data.

In step 820, the UE 110 may determine a preset threshold of the transmission success rate. The preset threshold may be set by the system, or may be manually adjusted. In some embodiments, the preset threshold may be determined based on the historical data, multiple statistical analyses. For example, it is found that when the transmission success rate of the BSR is below 60%, the impact on the data item with high priority is great; when the transmission success rate of the BSR is above 60%, the impact on the data item with high priority is small; then the threshold of the transmission success rate of the BSR may be set to 60%. In some embodiments, the threshold of the transmission success rate of the BSR may be manually set by the UE, and adjusted according to the network condition.

In step 830, the UE may determine whether the transmission success rate of the BSR determined by the data with high priority is greater than the preset threshold. If the result of the determination is no, that is, the transmission success rate of the BSR determined by the data with high priority data is less than or equal to the preset threshold, going to step 840; if the result of the determination is yes, the transmission success rate of the BSR determined by the data with high priority is greater than the preset threshold, going to step 850. In step 840, the UE may transmit the BSR determined based on the data item with high priority, in an at least two paths duplication transmission mode. In some embodiments, transmitting the BSR determined by the data with high priority in a two paths duplication transmission mode to improve the probability that the data item with high reliability requests the uplink RB resources successfully. In step 850, the UE may transmit the BSR, determined based on the data item with high priority, in a single path transmission mode to save system resource.

In some embodiments, the UE may transmit a replicate of the at least one BSR with flexible length to the base station in duplication in at least two transmission paths, wherein the replicate of the at least one BSR with flexible length is generated based on one or more LCGs with priorities greater than a preset value. For example, the UE may duplicate at least one LCG, which takes the data item with priority higher than a preset value in the BSR with flexible length, to form a new BSR, and transmit the new BSR to the base station. In some embodiments, if the data item of the LCGs indicated in one BSR includes data with high reliability service and general data, only data with high reliability service may be duplicated to form a new BSR to avoid that the LCG with high reliability cannot be allocated with uplink RB resources because of the failure of the BSR transmission or the resource shortage of the base station. For example, the UE needs two LCGs to transmit the data with high priority and five LCGs to transmit the general data, but the base station may merely allocate two channels for the UE at the time, then the base station may allocate the two channels for the LCGs with high priority data to be transmit preferentially.

In some embodiments, when the UE transmits the BSR in an at least two paths duplication mode, the BSR may be successfully transmitted to the base station in two or more paths. The base station may process the successfully transmitted BSR, keep any one of the successfully transmitted BSR, and discard the other BSRs. In some embodiments, a feedback of the BSR transmission may be added to the procedure of the data requesting. After receiving the feedback of the unsuccessful transmission, the unsuccessfully transmitted BSR may be transmitted again immediately.

It should be noted that the above description is provided for the purposes of illustration, and not intended limit the scope of the present disclosure. Obviously, for persons having ordinary skills in the art, multiple variations and modifications may be made under the teachings of the present disclosure. For example, one or more other operations may be added to the flow charts, or one or more operations may be omitted from the flow chart; or one storing step may be added to store the data of all steps. As another example, the step 810 and step 820 may be combined to acquire a transmission success rate of the BSR and a preset threshold of the transmission success rate. All such variations and modifications are within the protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the features required by the subject of the application are more than those mentioned in the claims. Rather, claim subject matter lie in less than all features of a single foregoing disclosed embodiment.

What is claimed is:

1. A system of determining a buffer status report (BSR), comprising:
   at least one storage medium storing a set of instructions or programs;
   at least one processor in communication with the at least one storage medium, wherein when executing the set of instructions or programs, the at least one processor is directed to:
   obtain, from a buffer, at least one data item to be sent;
   determine a size of the at least one data item to be sent;
   determine a minimum number of required logical channel groups (LCGs) based on the at least one data item to be sent;
   determine a service type of the at least one data item to be sent;
   determine a priority of the at least one data item to be sent based on a preset rule and the service type of the at least one data item to be sent;
   determine LCG identifiers (LCG IDs) corresponding to the required LCGs based on the minimum number of the required LCGs;
   determine at least one BSR with flexible length based on the size of the at least one data item to be sent the minimum number of the required LCGs, the LCG IDs, and the priority of the at least one data item to be sent,
   wherein, information of the at least one BSR with flexible length includes the minimum number of the required LCGs, LCG IDs identifiers (LCG IDs) respectively associated with the minimum number of the required LCGs, and at least one buffer area corresponding to the LCG IDs; and
   transmit the at least one BSR with flexible length that is determined based on the at least one data item to be sent with a high priority to a base station in duplication in the at least two transmission paths; or
   transmit a replicate of the at least one BSR with flexible length to the base station in duplication in the at least two transmission paths, wherein the replicate of the at least one BSR with flexible length is generated based on one or more LCGs with priorities greater than a preset value.

2. The system of claim 1, wherein to determine a minimum number of required logical channel groups (LCGs) based on the at least one data item to be sent, the at least one processor is further directed to:
   determine the LCGs occupied by the at least data item to be sent based on the at least one data item to be sent; and
   determine the minimum number of the required LCGs based on the LCGs occupied by the at least one data item to be sent.

3. The system of claim 1, wherein to determine the at least one BSR with flexible length based on the size of the at least one data item to be sent, the minimum number of the required LCGs, and the LCG IDs, the at least one processor is further directed to:
   determine a structure of the at least one BSR with flexible length; and
   determine a preliminary length of the at least one BSR with flexible length.

4. The system of claim 1, wherein the service type of the at least one data item to be sent includes at least one of an Ultra Reliable & Low Latency Communication (URLLC) service, a Guaranteed Bit Rate (GBR) service, and a Non-Guaranteed Bit Rate (NGBR) service.

5. The system of claim 1, wherein to determine a priority of the at least one data item to be sent based on a preset rule and the service type of the at least one data item to be sent, the at least one processor is further directed to:
- determine a QoS Class Identifier (QCI) of the at least one data item to be sent based on the service type of the at least one data item to be sent, wherein the value of the QCI is an integer between 0 and 9;
- set the value of the QCI corresponding to a service type with a highest priority as 0,
- wherein, if the value of the QCI equals to 0, the corresponding service type of the at least one data item to be sent is an Ultra Reliable & Low Latency Communication (URLLC) service,
- if the value of the QCI is an integer between 1 and 4, the corresponding service type of the at least one data item to be sent is a Guaranteed Bit Rate (GBR) service, and
- if the value of the QCI is an integer between 5 and 9, the corresponding service type of the at least one data item to be sent is a Non-Guaranteed Bit Rate (NGBR) service.

6. The system of claim 1, wherein the at least one processor is further directed to:
- transmit the at least one BSR with flexible length that is determined based on the at least one data item to be sent with a high priority to a base station for requesting an uplink resource.

7. A method of determining a buffer status report (BSR), comprising:
- obtaining, by a user equipment (UE) from a buffer, at least one data item to be sent;
- determining, by the UE, a size of the at least one data item to be sent;
- determining, by the UE, a minimum number of required logical channel groups (LCGs) based on the at least one data item to be sent;
- determine a service type of the at least one data item to be sent;
- determine a priority of the at least one data item to be sent based on a preset rule and the service type of the at least one data item to be sent;
- determine LCG identifiers (LCG IDs) corresponding to the required LCGs based on the minimum number of the required LCGs;
- determining, by the UE, at least one BSR with flexible length based on the size of the at least one data item to be sent, the minimum number of the required LCGs, the LCG IDs, and the priority of the at least one data item to be sent,
- wherein, information of the at least one BSR with flexible length includes the minimum number of the required LCGs, LCG IDs respectively associated with the minimum number of the required LCGs, and at least one buffer area corresponding to the LCG IDs; and
- transmit the at least one BSR with flexible length that is determined based on the at least one data item to be sent with a high priority to a base station in duplication in the at least two transmission paths; or
- transmit a replicate of the at least one BSR with flexible length to the base station in duplication in the at least two transmission paths, wherein the replicate of the at least one BSR with flexible length is generated based on one or more LCGs with priorities greater than a preset value.

8. The method of claim 7, wherein the determining, by the UE, a minimum number of required logical channel groups (LCGs) based on the at least one data item to be sent comprises:
- determining the LCGs occupied by the at least one data item to be sent based on the at least one data item to be sent; and
- determining the minimum number of the required LCGs based on the LCGs occupied by the at least one data item to be sent.

9. The method of claim 7, wherein the determining the at least one BSR with flexible length based on the size of the at least one data item to be sent, the minimum number of the required LCGs, and the LCG IDs comprises:
- determining a structure of the at least one BSR with flexible length; and
- determining a preliminary length of the at least one BSR with flexible length.

10. The method of claim 7, wherein the service type of the at least one data item to be sent includes at least one of an Ultra Reliable & Low Latency Communication (URLLC) service, a Guaranteed Bit Rate (GBR) service, and a Non-Guaranteed Bit Rate (NGBR) service.

11. The method of claim 7, wherein the determining a priority of the at least one data item to be sent based on a preset rule and the service type of the at least one data item to be sent comprises:
- determining a QoS Class Identifier (QCI) of the at least one data item to be sent based on the service type of the at least one data item to be sent, wherein the value of the QCI is an integer between 0 and 9; and
- setting the value of the QCI corresponding to a service type with a highest priority as 0,
- wherein, if the value of the QCI equals to 0, the corresponding service type of the at least one data item to be sent is an Ultra Reliable & Low Latency Communication (URLLC) service,
- if the value of the QCI is an integer between 1 and 4, the corresponding service type of the at least one data item to be sent is a Guaranteed Bit Rate (GBR) service, and
- if the value of the QCI is an integer between 5 and 9, the corresponding service type of the at least one data item to be sent is a Non-Guaranteed Bit Rate (NGBR) service.

12. The method of claim 7, further comprising:
- transmitting the at least one BSR with flexible length that is determined based on the at least one data item to be sent with a high priority to a base station for requesting an uplink resource.

13. A device for determining a buffer status report (BSR) comprising computer programs, when executing the computer programs, the device is directed to:
- obtain, from a buffer, at least one data item to be sent;
- determine a size of the at least one data item to be sent;
- determine a minimum number of required logical channel groups (LCGs) based on the at least one data item to be sent;
- determine a service type of the at least one data item to be sent;
- determine a priority of the at least one data item to be sent based on a preset rule and the service type of the at least one data item to be sent;
- determine LCG identifiers (LCG IDs) corresponding to the required LCGs based on the minimum number of the required LCGs;
- determine at least one BSR with flexible length based on the size of the at least one data item to be sent the minimum number of the required LCGs, the LCG IDs, and the priority of the at least one data item to be sent,
- wherein, information of the at least one BSR with flexible length includes the minimum number of the required LCGs, LCG IDs identifiers (LCG IDs) respectively associated with the minimum number of the required LCGs, and at least one buffer area corresponding to the LCG IDs; and transmit the at least one BSR with flexible length that is determined based on the at least one data item to be sent with a high priority to a base station in duplication in the at least two transmission paths; or transmit a replicate of the at least one BSR with flexible length to the base station in duplication in the at least two transmission paths, wherein the replicate of the at least one BSR with flexible length is generated based on one or more LCGs with priorities greater than a preset value.

* * * * *